No. 720,639. PATENTED FEB. 17, 1903.
F. TONI.
PNEUMATIC TIRE.
APPLICATION FILED SEPT. 8, 1902.
NO MODEL.

WITNESSES:
G. V. Symes.
Hedley J. Harrop.

INVENTOR.
Francesco Toni.
Per Robert E. Phillips
Attorney.

UNITED STATES PATENT OFFICE.

FRANCESCO TONI, OF LONDON, ENGLAND.

PNEUMATIC TIRE.

SPECIFICATION forming part of Letters Patent No. 720,639, dated February 17, 1903.

Application filed September 8, 1902. Serial No. 122,580. (No model.)

*To all whom it may concern:*

Be it known that I, FRANCESCO TONI, a subject of the King of Great Britain, residing at 9 Montague Place, Russell Square, London, in the county of Middlesex, England, have invented a new and useful Improvement in Pneumatic Tires, (for which I have applied for Letters Patent in the United Kingdom of Great Britain and Ireland, numbered 17,787, and bearing date the 13th day of August, 1902,) of which the following is a full and complete specification.

This invention relates to pneumatic tires; and it consists of an improved means or method of attaching the covers thereof to wheel rims or fellies and is more particularly applicable to the attachment of heavy vehicle-tires to wood fellies.

Figure 1:
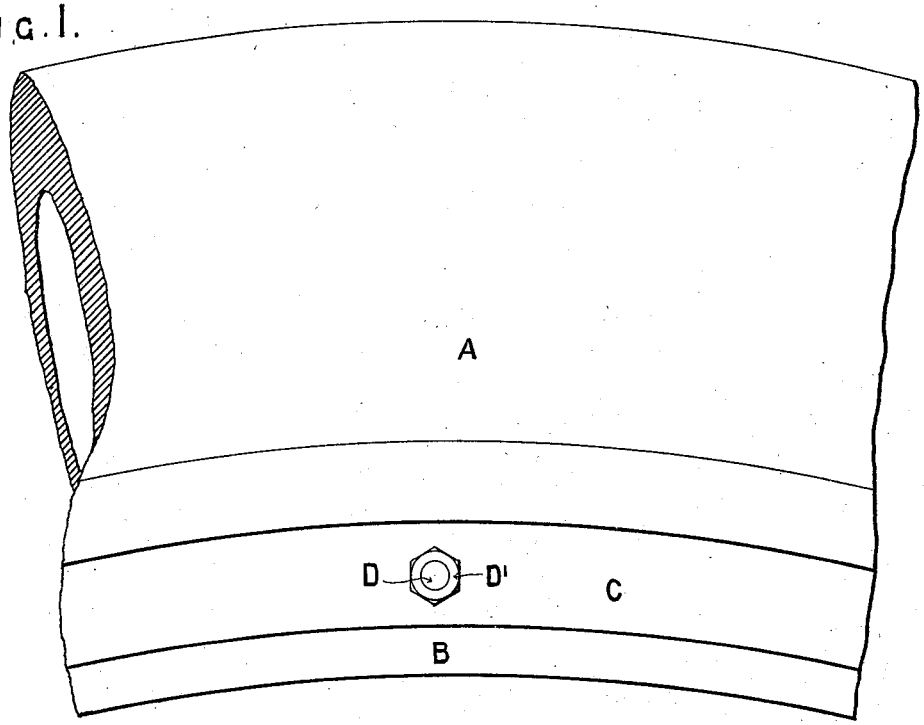
Figure 2:
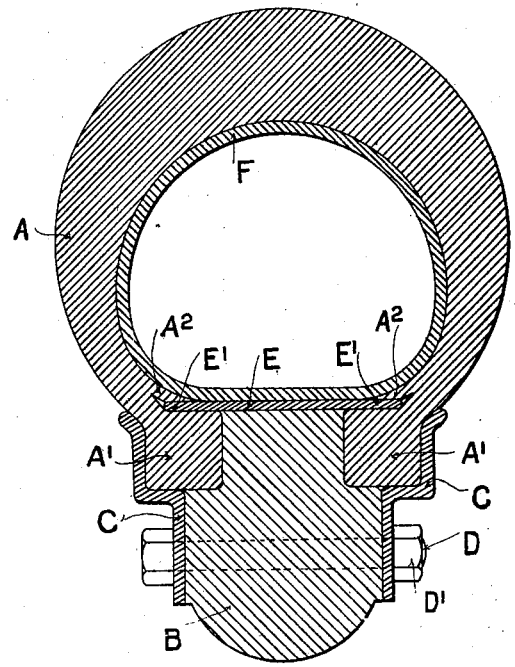

In the accompanying drawings, which illustrate one method of carrying this invention into effect, Figure 1 is a broken view in side elevation of a tire constructed according to this invention, and Fig. 2 is a view in transverse section thereof.

Throughout both views similar parts are denoted by like letters of reference.

According to the present invention the edges of the tire-cover A are formed with enlarged beads A', preferably, as shown, of a square cross-section. These beads A' are composed of canvas or other material and rubber or are formed with a flexible but incompressible core of any suitable material. The wood felly B of the wheel is channeled or rabbeted at its outer edges to receive the said beads A', which are kept in place thereon by annular-shaped rings C, one on either side of the felly and attached thereto by bolts D and nuts D' and a flat annular plate E, the edges E' of which overhang the channels or rabbets of the wood felly and engage the outer or top edges of the beads A'. This plate E is permanently fixed to the wood felly B by screws or in other convenient manner. It will be seen that the arrangement is such that when the tire is in position on the felly the beads A' are tightly clamped between the flat annular plate E, the felly B, and the side rings C, so that all possibility of the tire creeping is avoided.

In order to obtain access to the inner air-tube F, which is of the usual construction and provided with any suitable valve for inflating and deflating purposes, it is only requisite to remove or partially remove one of the side rings C, so as to allow one of the beaded edges A' to be withdrawn from the cavity formed by and between the felly B, plate E, and rings C. To facilitate said withdrawal, tabs may be attached to the beads at suitable intervals.

The bolts and nuts securing the rings C to the felly B may pass directly through it, as shown, or the felly may be furnished with an internally-threaded sleeve, into which the ring-attaching screws or bolts are threaded.

Ears or strips $A^2$ are formed on the inner sides of the cover A, which is of the usual construction, so as to prevent the inner air-tube F contacting with the edges E' of the plate E and so prevent the air-tube from becoming damaged thereby.

What I claim, and desire to secure by Letters Patent, is—

1. A pneumatic tire for heavy vehicle-wheels consisting of a tire-cover, of an air-tube located within said cover, of enlarged flexible but incompressible rectangular-shaped beads formed on the edges of said cover, of a wood felly, of rectangular rabbets formed in the outer edges of said felly and adapted to receive the beads of the tire-cover, of annular rings formed with rectangular rabbets, one of said rings on either side of the felly and engaging the said felly and the outer side of the bead on the cover, of nutted bolts passing through said rings and fellies for securing the rings to the felly and of a flat annular plate permanently fixed to the periphery of the wood felly and having edges overhanging the rabbets in said felly and engaging the enlarged beads of the cover, as set forth.

2. A pneumatic tire for vehicle-wheels consisting of a cover A, of an air-tube F, of enlarged beads A', formed on the edges of said cover, of tabs attached to said edges, of a wood felly B, of rabbets formed in the outer edge of said felly and adapted to receive the enlarged beads of the tire-cover, of annular-shaped rings C, one on either side of the said felly, and engaging said beads A', of nuts D' and bolts D passing through said rings C and felly B for securing the rings to the felly, of the flat annular plate E permanently fixed to the periphery of the felly B and having edges E' overhanging the rabbets in the felly and engaging the enlarged beads A' of the cover A and of the ears $A^2$ formed on the inner side of the cover A adapted to protect the edges E' of the plate E from contacting with the air-tube, as set forth.

FRANCESCO TONI.

Witnesses:
G. V. SYMES,
A. MILLWARD FLACK.